(12) United States Patent
Telukuntla et al.

(10) Patent No.: US 8,077,820 B2
(45) Date of Patent: Dec. 13, 2011

(54) DETECTION OF FREQUENCY CORRECTION BURSTS AND THE LIKE

(75) Inventors: Krishna Prabhu Telukuntla, Bangalore (IN); Peter Kabell Jensen, Reading (GB)

(73) Assignee: Agere Systems Inc., Allentown, PA (US)

( * ) Notice: Subject to any disclaimer, the term of this patent is extended or adjusted under 35 U.S.C. 154(b) by 952 days.

(21) Appl. No.: 12/042,619

(22) Filed: Mar. 5, 2008

(65) Prior Publication Data
US 2009/0225918 A1 Sep. 10, 2009

(51) Int. Cl.
*H04L 7/02* (2006.01)
*H04L 12/26* (2006.01)
*H04L 12/28* (2006.01)

(52) U.S. Cl. .................. 375/360; 370/252; 370/431

(58) Field of Classification Search ............... 375/360; 370/252, 431
See application file for complete search history.

(56) References Cited

U.S. PATENT DOCUMENTS

| | | | | |
|---|---|---|---|---|
| 5,724,657 | A * | 3/1998 | Lin et al. | 455/423 |
| 6,240,098 | B1 * | 5/2001 | Thibault et al. | 370/431 |
| 6,693,882 | B1 * | 2/2004 | Gu et al. | 370/252 |
| 2001/0055311 | A1 * | 12/2001 | Trachewsky et al. | 370/445 |
| 2002/0006136 | A1 * | 1/2002 | Mallory et al. | 370/466 |
| 2002/0012343 | A1 * | 1/2002 | Holloway et al. | 370/389 |
| 2002/0027886 | A1 * | 3/2002 | Fischer et al. | 370/255 |

OTHER PUBLICATIONS

"Searching for Signal in Noise by Random Lag Singular Spectrum Analysis," by F. Varadi et al., To appear in *The Astrophysical Journal*, 526, Issue 2, 1999, 30 pages.
"*Simple, Effective Estimation of Frequency Based on Prony's Method*," by Donald W. Tufts and Paul Fiore, 0-7803-3192-3/96, 1996 IEEE, pp. 2801-2804.
"*Frequency Estimation by Proper Correlation Lag Constellations*," by Björn Völcker and Peter Händel, Proceedings Nordic Signal Processing Symposium, Jun. 2000, pp. 449-452.
"*Frequency Estimation From Proper Sets of Correlations*," by Björn Völcker and Peter Händel, IEEE Transactions on Signal Processing, vol. 50, No. 4, Apr. 2002, pp. 791-802.
"*Robust Frequency Burst Detection Algorithm for GSM/GPRS*," by G. Narendra Varma et al., Vehicular Technology Conference, Sep. 2004, VTC2004-Fall, 2004 IEEE 60th, vol. 6, Issue 26-29, pp. 3843-3846.

* cited by examiner

*Primary Examiner* — David C. Payne
*Assistant Examiner* — Sarah Hassan
(74) *Attorney, Agent, or Firm* — Mendelsohn, Drucker & Associates, P.C.; Craig M. Brown; Steve Mendelsohn

(57) ABSTRACT

In one embodiment, a frequency correction (FC) burst is detected in a complex signal received by a mobile station of a GSM/EDGE wireless communications network by applying the complex signal to one or more correlation paths of a burst detector within the mobile station. Each correlation path generates a correlation signal by multiplying a copy of the complex signal by the complex conjugate of a delayed version of the complex signal and then applies a correlation filter to the correlation signal. A combined correlation signal is formed by combining the filtered correlation signals from the one or more correlation paths. Peak detection is applied to the combined correlation signal, where a detected peak corresponds to the occurrence of the burst in the complex input signal. The correlation filters are designed such that the peak in the combined correlation signal occurs prior to the end of the burst.

15 Claims, 6 Drawing Sheets

DETECTION OF FREQUENCY CORRECTION BURSTS AND THE LIKE

BACKGROUND OF THE INVENTION

1. Field of the Invention

The present invention relates to communications, and, in particular, to the detection of frequency correction bursts during wireless communications between a base station and a mobile station.

2. Description of the Related Art

In wireless communications networks conforming to GSM/EDGE (Global System for Mobile Communications/ Enhanced Data Rates for GSM Evolution) standards, base stations transmit frequency correction (FC) bursts and synchronization bursts. Mobile stations detect the FC bursts to derive frequency correction information that the mobile stations then use to decode the synchronization bursts that enable the mobile stations to synchronize their operations with those of the base stations.

According to the GSM/EDGE standards, an FC burst is ideally equivalent to an unmodulated carrier of 1625/24 kHz. In the real world, there will be carrier-frequency errors resulting from differences in the frequencies of the local oscillators at the base station and mobile station as well as possibly from Doppler effects due to motion of the mobile station relative to the base station. The purpose of FC bursts is to enable a mobile station to determine the carrier-frequency error so that subsequent processing, for example, of a synchronization burst can compensate for that carrier-frequency error. It is desirable to detect the end of an FC burst exactly so that all the samples of the FC burst can be used in carrier-frequency error estimation.

Prior-art techniques for detecting FC bursts include (1) cross correlation with a number of predetermined sequences and choosing the one with the maximum correlation; (2) application of an adaptive notch filter to the input signal, where adaptation is implemented using a least mean squares (LMS) algorithm, where an FC burst is detected based on the error power; and (3) predicting samples using an LMS algorithm and detecting an FC burst based on the error signal of the LMS algorithm. These prior-art techniques fail to provide accurate, robust detection for low signal-to-noise conditions.

SUMMARY OF THE INVENTION

In one embodiment, the present invention is a computer-implemented method for detecting a burst in a complex input signal. The complex input signal is applied to one or more correlation paths. Each correlation path (1) generating first and second copies of the complex input signal, where there is a delay between the first and second copies of the complex input signal; (2) generating a complex conjugate of the second copy of the complex input signal; (3) multiplying the first copy of the complex input signal and the complex conjugate of the second copy of the complex input signal to generate a correlation signal; and (4) applying a correlation filter to the correlation signal to generate a corresponding filtered correlation signal. A combined correlation signal is generated from the one or more filtered correlation signals from the one or more correlation paths. Peak detection processing is applied to the combined correlation signal to detect a peak indicative of the burst in the complex input signal, wherein each correlation filter is designed such that the peak in the combined correlation signal occurs prior to termination of the burst.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Figure 1:
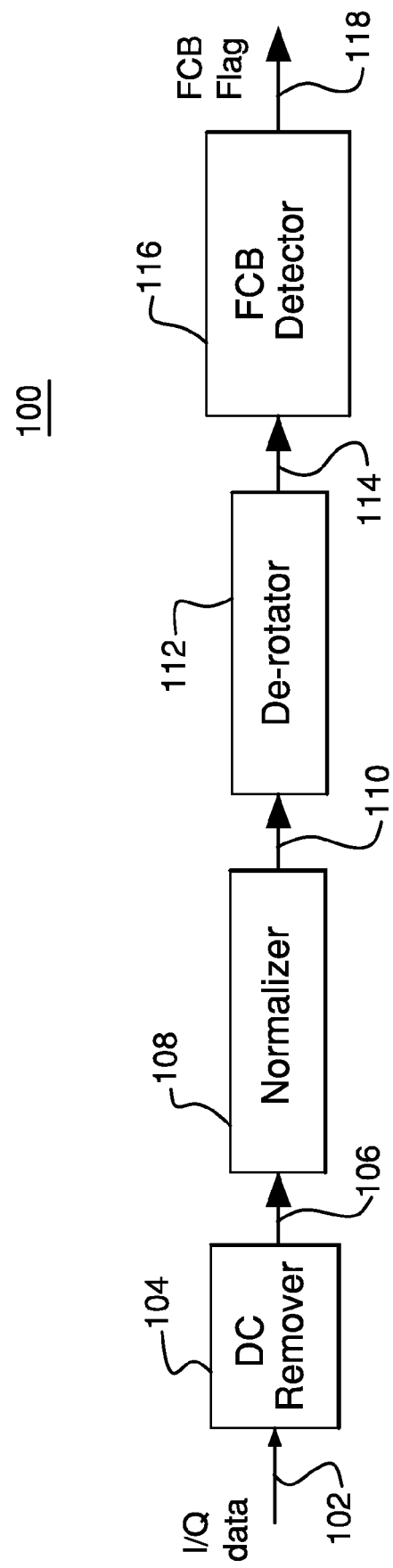
FIG. 1 shows a portion of a mobile station associated with the detection of frequency correction (FC) bursts.

FIG. 1 shows a portion of a mobile station 100 associated with the detection of frequency correction (FC) bursts. In particular, FIG. 1 shows DC remover 104, normalizer 108, de-rotator 112, and FC burst (FCB) detector 116.

DC remover 104 receives digitized complex signal 102 comprising in-phase (I) and quadrature (Q) components corresponding to the analog input signal received by mobile station 100 and processed by the analog front end (AFE) (not shown in FIG. 1) of mobile station 100. DC remover 104 removes any DC offset in digitized complex signal 102 to generate DC-removed signal 106. Normalizer 108 normalizes DC-removed signal 106 to generate normalized signal 110 having constant energy. De-rotator 112 removes inherent rotation in normalized signal 110 to generate (desired) baseband signal 114 (suitable for FCB detector 116). FCB detector 116 analyzes baseband signal 114 and generates FCB flag signal 118 indicating the detection of FC bursts in baseband signal 110. FCB flag signal 118 can then be used by subsequent processing (not shown in FIG. 1), such as carrier-frequency error estimation, which processes the stored data corresponding to the FC burst to estimate the error between the carrier frequency of the received signal and the mobile station's local oscillator.

Figure 2:
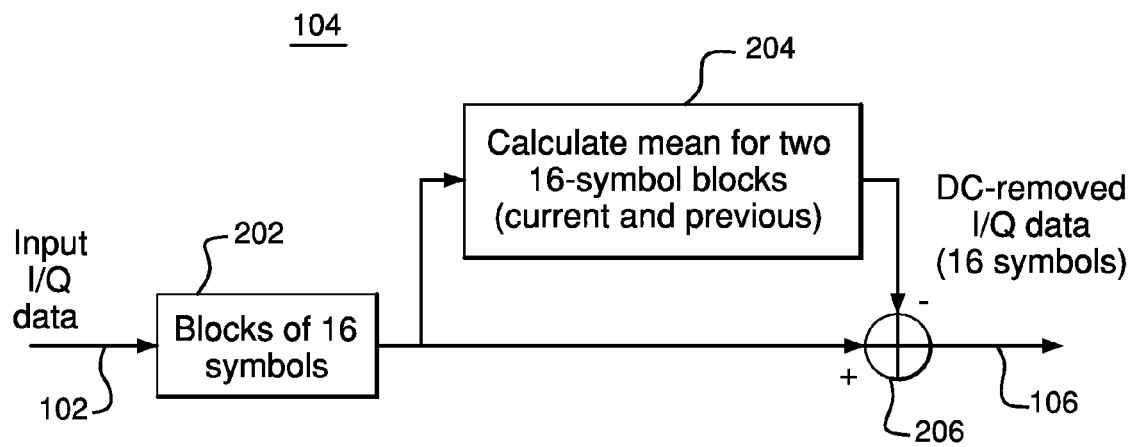
FIG. 2 shows a block diagram of the DC remover of FIG. 1, according to one embodiment of the present invention.

FIG. 2 shows a block diagram of DC remover 104 of FIG. 1, according to one embodiment of the present invention. In this particular embodiment, the average value for 32 samples (e.g., the current and previous 16-sample blocks of data) of complex signal 102 is calculated (204) and subtracted (206) from the current block of 16 samples (202) to generate DC-removed signal 106. In one implementation, DC remover 104 treats the I and Q data of complex signal 102 separately. That is, the average value for 32 I samples are calculated and subtracted from the current block of I samples, and the average value for 32 Q samples are calculated and subtracted from the current block of Q samples, thereby generating the I and Q data for complex DC-removed signal 106. Those skilled in the art will understand that there are many suitable alternative methods for implementing DC remover 104.

Figure 3:
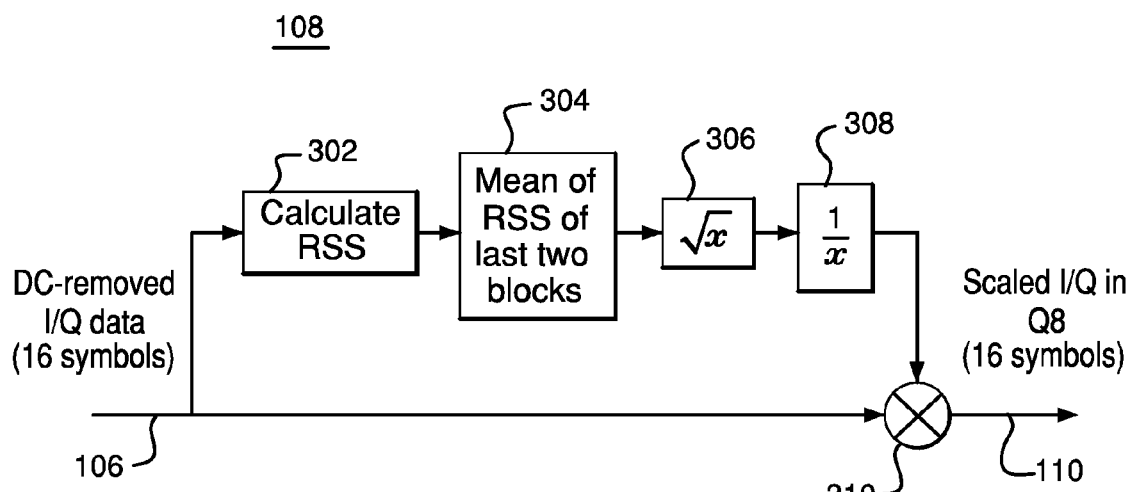
FIG. 3 shows a block diagram of the normalizer of FIG. 1, according to one embodiment of the present invention.

FIG. 3 shows a block diagram of normalizer 108 of FIG. 1, according to one embodiment of the present invention. In this particular embodiment, RSS (received signal strength) values are generated (302) for each 16-sample block of data in DC-removed signal 106, and DC-removed signal 106 is multiplied (310) by the inverse (308) of the square root (306) of the average RSS value for the last two 16-sample blocks (304) to generate normalized signal 110. Those skilled in the art will understand that there are many suitable alternative methods for implementing normalizer 108.

De-rotator 112 multiplies the normalized signal 110 by a sine wave corresponding to the ideal FC burst frequency of 1625/24 kHz to generate baseband signal 114. In one embodiment of the present invention, normalized signal 110 is de-rotated by an integer multiple of $$\frac{\pi}{2}$$

to compensate for rotation inherent in the relevant modulation scheme, such as GMSK (Gaussian mean shift keying) modulation used in GSM/EDGE systems. Equation (1) shows the processing of de-rotator 112 for rotation in the counter-clockwise direction, while Equation (2) shows the processing of de-rotator 112 for rotation in the clockwise direction, as follows:

$$x_d(n) = x_n(n)e^{-\frac{j\pi n}{2}} \quad (1)$$

$$x_d(n) = x_n(n)e^{+\frac{j\pi n}{2}} \quad (2)$$

where $x_n(n)$ is the $n^{th}$ sample of normalized signal 110 and $x_d(n)$ is the $n^{th}$ sample of de-rotated baseband signal 114. Those skilled in the art will understand that there are alternative methods for implementing de-rotator 112. FCB detector 116 processes baseband signal 114 to detect the presence of FC bursts in the received input signal. FCB detector 116 generates a flag 118 indicating the timing of the detection of each FC burst in the received input signal. Detection of an FC burst triggers other processing in mobile station 100 (not shown in FIG. 1) to estimate the frequency of the sinusoidal burst, which indicates the frequency error between the base station and the mobile station's local oscillator.

Figure 4:
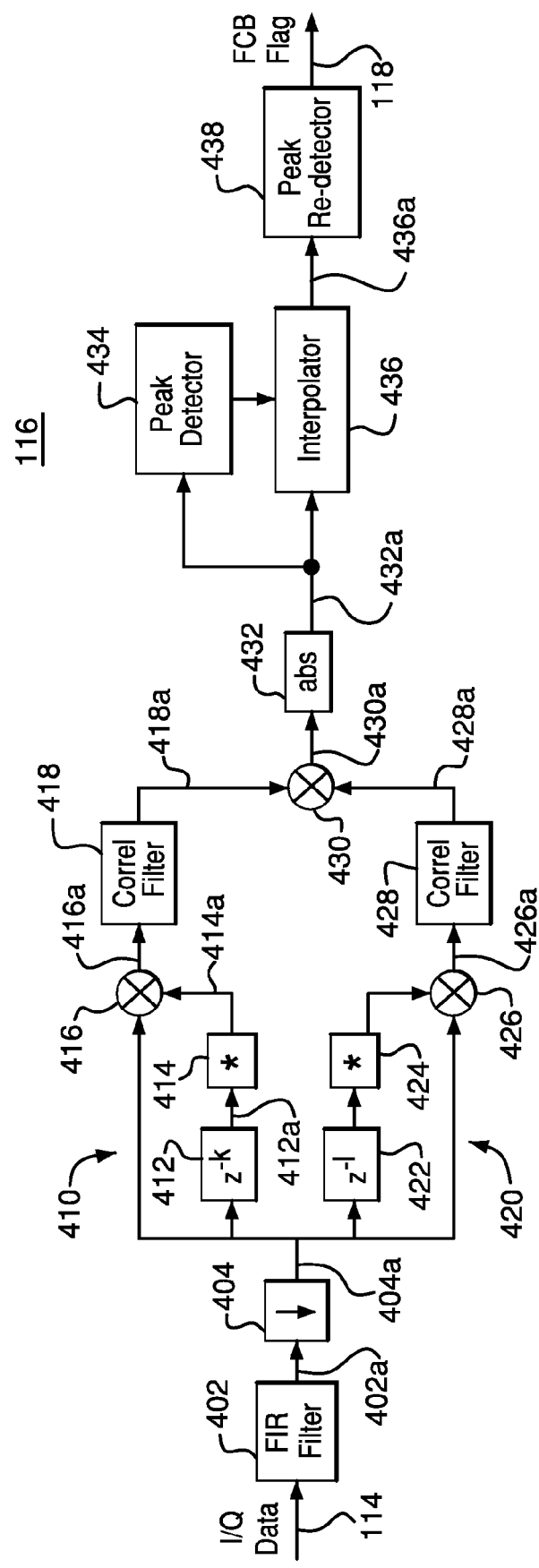
FIG. 4 shows a block diagram of an FC burst (FCB) detector of FIG. 1, according to one embodiment of the present invention.

FIG. 4 shows a block diagram of FCB detector 116 of FIG. 1, according to one embodiment of the present invention.

Figure 5:
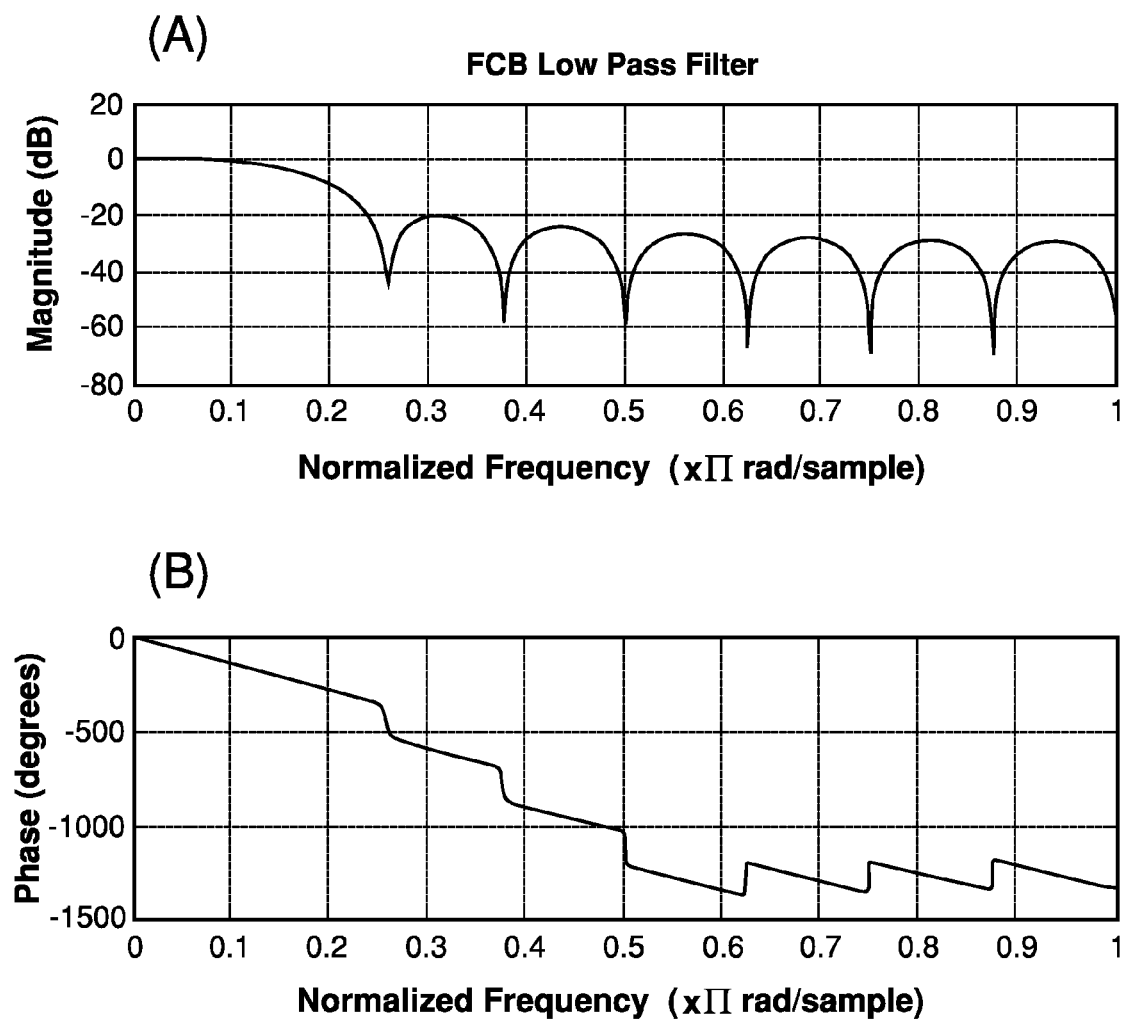
FIGS. 5(A) and 5(B) show the magnitude response and group delay (i.e., phase response), respectively, of the FIR filter of FIG. 4.

FIR filter 402 applies low-pass filtering to baseband signal 114 generated by de-rotator 112 of FIG. 1. For optimization purposes, an FIR filter is used for low-pass filtering. FIGS. 5(A) and 5(B) show the magnitude response and group delay (i.e., phase response), respectively, of FIR filter 402. Those skilled in the art will understand that there are alternative methods for implementing low-pass filtering.

Downsampler 404 downsamples the resulting filtered signal 402a by a specified factor to generate downsampled signal 404a. In one implementation of the present invention, the received input signal is sampled such that each FC burst has 148 samples. Downsampling by a factor of four results in downsampled signal 404a having 37 samples per FC burst.

Downsampled signal 404a is then processed in parallel along two different correlation paths 410 and 420. Within correlation path 410, delay element 412 applies a k-sample delay to one copy of downsampled signal 404a, and complex conjugate element 414 generates the complex conjugate 414a of the resulting delayed signal 412a. In alternative embodiments, the order of delay element 412 and complex conjugate element 414 can be reversed. In further alternative embodiments, the undelayed signal 404a can be conjugated rather than the delayed signal 412a, although this may result in the need to adjust the amount of the delay (i.e., the value of k) imposed by delay element 412 in order to account for the processing time of the complex conjugate element.

Figure 6:
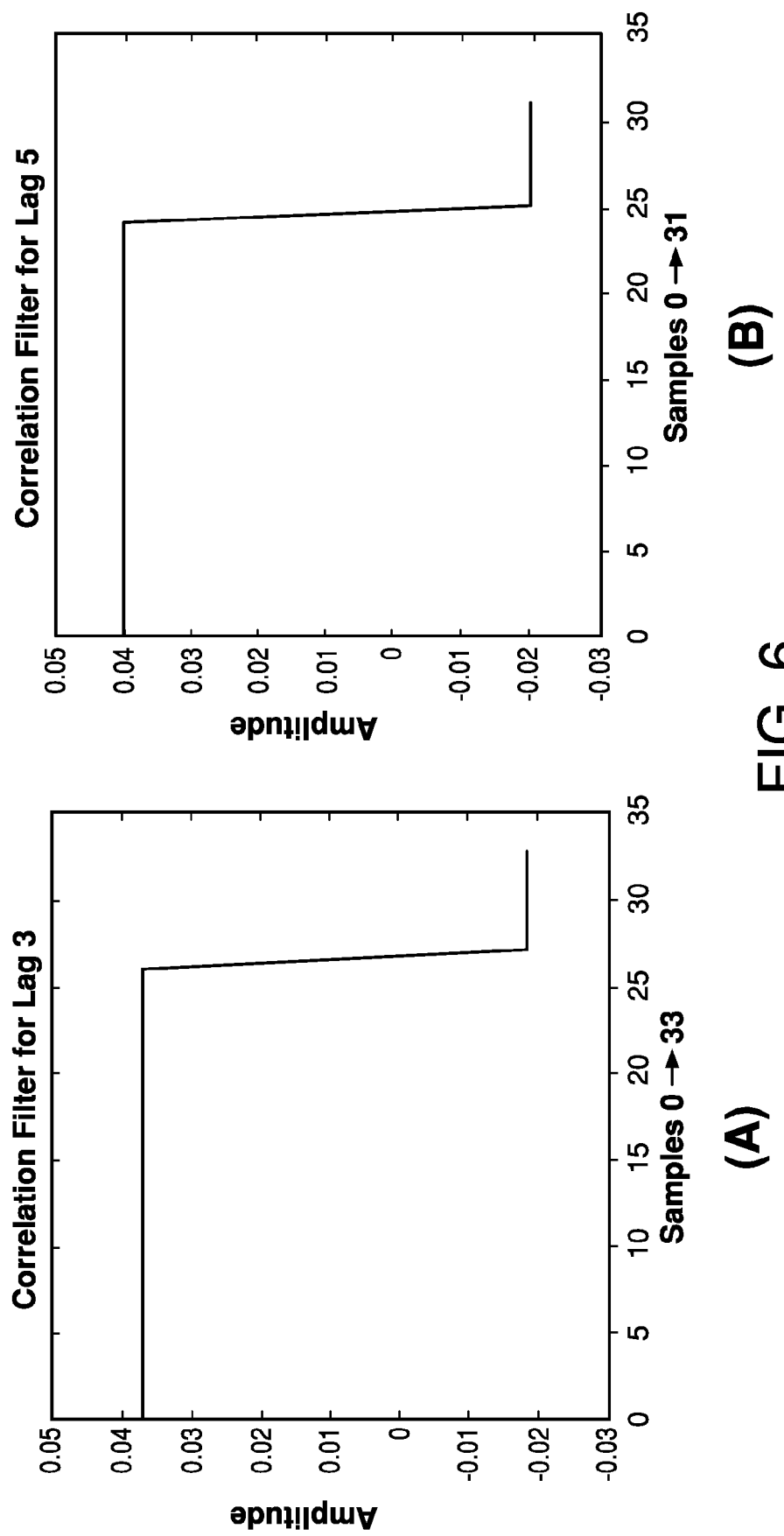
FIGS. 6(A) and 6(B) show graphical representations of the filter coefficients of the correlation filters for an implementation of the FCB detector of FIG. 4 with 4× downsampling in which k=3 and l=5.
Figure 7:
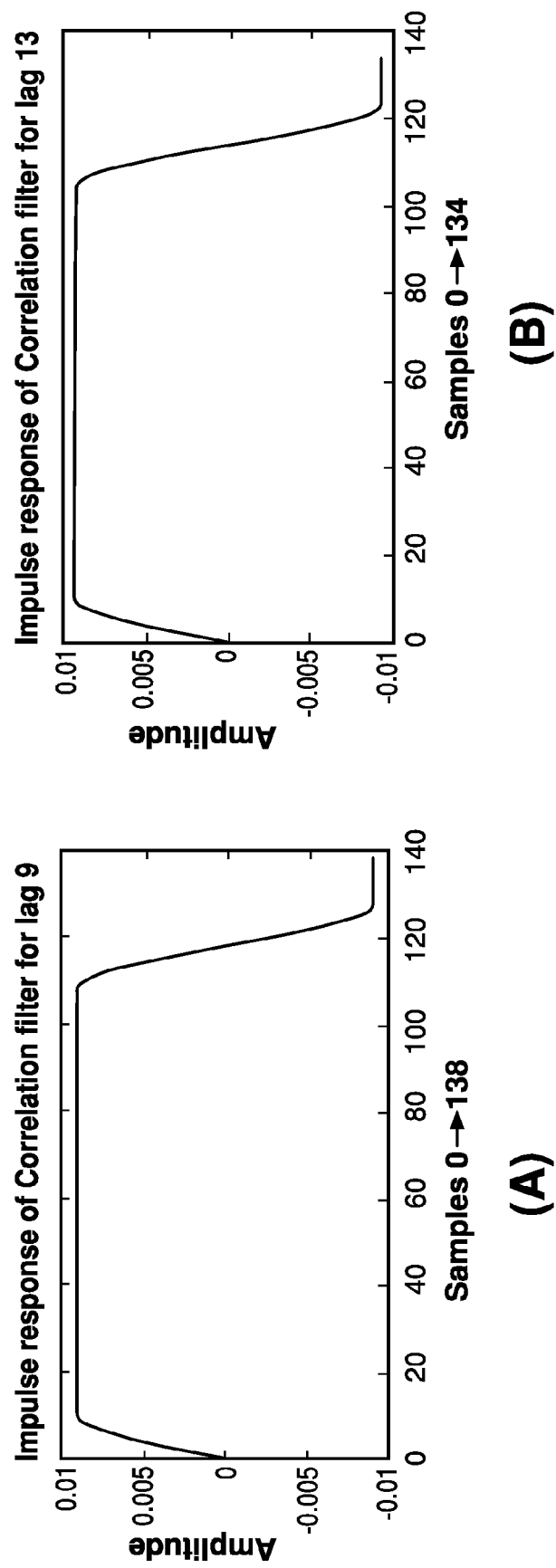
FIGS. 7(A) and 7(B) show graphical representations of the filter coefficients of the correlation filters for an implementation of the FCB detector of FIG. 4 without any downsampling in which k=9 and l=13.

Multiplier 416 multiplies the resulting conjugated, delayed signal 414a with another copy of downsampled signal 404a to generate complex correlation signal 416a. Correlation filter 418 filters correlation signal 416a to generate filtered correlation signal 418a. Correlation filter 418 is discussed further below in conjunction with FIGS. 6 and 7.

The processing within correlation path 420 is similar to that within correlation path 410, with elements 422-428 of path 420 being analogous to elements 412-418 of path 410, except that delay element 422 applies an l-sample delay to its copy of downsampled signal 404a, where l is different from k, and correlation filter 428 applies a different filter transfer function from that applied by correlation filter 418.

Combiner 430 combines filtered correlation signal 418a from correlation path 410 and filtered correlation signal 428a from correlation path 420 to generate combined correlation signal 430a. In the embodiment shown in FIG. 4, combiner 430 is a multiplier that multiplies filtered correlation signals 418a and 428a together to form combined correlation signal 430a. In an alternative embodiment, combiner 430 may be an adder that adds the two filtered correlation signals together to form the combined correlation signal.

Absolute value element 432 generates the absolute value of combined correlation signal 430a, and peak detector 434 detects peaks in the resultant correlation signal 432a. Peak detection can be implemented in a variety of different ways, including detection of a peak when the maximum value of resultant correlation signal 432a within a window of specified size is located at the middle of the window. To avoid false detections, peak detection can be limited to resultant correlation signal values that are greater than a specified threshold, whose value can be determined empirically during off-line simulation or on-line testing.

After detecting a peak, interpolator 436 applies $2^{nd}$-order or higher interpolation to a specified number of samples of resultant correlation signal 432a corresponding to the location of the detected peak to generate upsampled signal 436a. For example, in one possible implementation, interpolator 436 applies $2^{nd}$-order polynomial interpolation to three samples of resultant correlation signal 432a (i.e., the sample corresponding to the detected peak and the samples on either side of that peak sample) to generate upsampled signal 436a having more than three samples. Peak re-detector 438 can then apply appropriate peak detection processing to refine the identified location of the peak in upsampled signal 436a. Note that, for $2^{nd}$-order polynomial interpolation, the largest value in the upsampled signal will correspond to the refined peak. The resulting flag 118 identifies the location of the peak in the upsampled signal, which in turn indicates the detection of an FC burst in the received input signal.

Downsampler 404, interpolator 436, and peak re-detector 438 are optional elements. However, when implemented, they can be designed in a correlated manner. For example, when downsampler 404 is designed to downsample by a factor of four, interpolator 436 can be used to generate three interpolated samples between consecutive samples in resultant correlation signal 432a. In that case, the resolution of the timing of flag 118 will correspond to individual samples of baseband signal 114 (before down sampling 404).

During the presence of an FC burst, the complex correlation signals generated at multipliers 416 and 426 are constant when the FC burst is an ideal complex sinusoidal burst.

Therefore, the filtered correlation signals 418a and 428a have maximum values close to the end of an FC burst. The amounts of delay imposed by the two delay elements are chosen differently so that the effect of noise and interference in the received signal are minimized by combiner 430 (i.e., by adding or multiplying the filtered correlation signals. In one possible implementation of FCB detector 116, k=3 and l=5, such that delay element 412 delays its copy of downsampled signal 404a by 3 samples, where 3 samples corresponds to 12 samples of a burst signal, and delay element 422 delays its copy of downsampled signal 404a by 5 samples, where 5 samples corresponds to 20 samples of a burst signal.

FIGS. 6(A) and 6(B) show graphical representations of the filter coefficients of correlation filters 418 and 428, respectively, for an implementation of FCB detector 116 with 4× downsampling in which k=3 and l=5. In particular, as shown in FIG. 6(A), for a 3-sample delay, correlation filter 418 is a 34-tap filter, whose coefficients $c_i$ are $\frac{1}{27}$ for taps i=0 to i=26 and $-\frac{1}{54}$ for taps i=27 to i=33, where coefficient $c_0$ is applied to the most-recent sample of correlation signal 416a, coefficient $c_1$ is applied to the $2^{nd}$ most-recent sample of correlation signal 416a, and so on. Similarly, as shown in FIG. 6(B), for a 5-sample delay, correlation filter 428 is a 32-tap filter, whose coefficients $d_i$ are 0.04 for taps i=0 to i=24 and −0.02 for taps i=25 to i=31, where coefficient $d_0$ is applied to the most-recent sample of correlation signal 426a, coefficient $d_1$ is applied to the $2^{nd}$ most-recent sample of correlation signal 426a, and so on.

The values of the coefficients for correlation filters 418 and 428 represented in FIGS. 6(A) and 6(B) imply that a peak in resultant correlation signal 432a will correspond to a location prior to the end of an FC burst. In particular, the fact that there are positive coefficient values for the lower-numbered taps and negative coefficient values for the higher-numbered taps implies that the peak in the resultant correlation signal will appear prior to the end of an FC burst. For 3-sample and 5-sample delays in FCB detector 116 and the coefficients of FIGS. 3(A) and 3(B), peaks will typically be detected at a location 6 samples prior to the end of an FC burst.

In other implementations, one or both of correlation paths 410 and 420 can be implemented using delays different from a 3-sample delay and a 5-sample delay, respectively, and/or using filter coefficients other than those shown in FIGS. 6(A) and 6(B), respectively. For example, a correlation filter with a fewer number of positive-valued coefficients and a greater number of negative-valued coefficients can be used to detect a peak at a location even earlier in an FC burst.

FIGS. 7(A) and 7(B) show graphical representations of the 139 and 135 tap coefficients, respectively, of correlation filters 418 and 428 of FIG. 4 for an embodiment of FCB detector 116 that is implemented without any downsampling, where delay element 412 applies a 9-sample delay and delay element 422 applies a 13-sample delay. Note that, as in FIGS. 6(A) and 6(B), the fact that there are positive coefficient values for the lower-numbered taps and negative coefficient values for the higher-numbered taps in FIGS. 7(A) and 7(B) implies that the peak in the resultant correlation signal will appear prior to the end of an FC burst. Detecting the existence of an FC burst prior to the end of the FC burst enables the other processing in the mobile station responsible for estimating the frequency of the sinusoidal burst to begin sooner, thereby reducing the overall latency of such processing and possibly reducing the amount of signal data needed to be buffered for perform that estimation.

The magnitude of the difference in the size of the delays implemented by delay elements 412 and 422 affects the sensitivity of FCB detector 116 to carrier-frequency error. In general, larger differences between the two delays imply greater sensitivity to carrier-frequency error. On the other hand, larger differences between the two delays implies a larger overall delay for at least one of the delay elements. A larger overall delay implies a smaller correlation filter, which implies less averaging for that correlation signal, which undesirably increases sensitivity to noise.

One of the reasons that the embodiment of FCB detector 116 shown in FIG. 4 has two correlation paths having different delays and different corresponding correlation filters is to filter out noise, such as thermal noise and interference. In alternative embodiments, FCB detector 116 could be implemented using more than two correlation paths having different delays and different corresponding correlation filters. Alternatively, FCB detector 116 could be implemented using a single correlation path.

Although the present invention has been described in the context of the detection of frequency correction bursts in communications networks conforming to GSM/EDGE standards, the present invention is not so limited. The present invention can also be implemented to detect frequency correction bursts in other types of communications networks, possibly corresponding to other standards. In general, the present invention can be implemented to detect complex sinusoidal bursts in other types of signals.

The present invention may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, microcontroller, or general-purpose computer.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. A computer-implemented method for detecting a burst in a complex input signal, the method comprising:
   (a) applying the complex input signal to one or more correlation paths, each correlation path:
      (1) generating first and second copies of the complex input signal, where there is a delay between the first and second copies of the complex input signal;
      (2) generating a complex conjugate of the second copy of the complex input signal;
      (3) multiplying the first copy of the complex input signal and the complex conjugate of the second copy of the complex input signal to generate a correlation signal; and
      (4) applying a correlation filter to the correlation signal to generate a corresponding filtered correlation signal;
   (b) generating a combined correlation signal from the one or more filtered correlation signals from the one or more correlation paths; and
   (c) applying peak detection processing to the combined correlation signal to detect a peak indicative of the burst in the complex input signal, wherein each correlation filter is designed such that the peak in the combined correlation signal occurs prior to termination of the burst.

2. The method of claim 1, wherein:
   step (a) comprises applying the complex input signal to at least first and second correlation paths having different delays between their respective first and second copies of the complex input signal and applying different correlation filters to their respective correlation signals; and
   step (b) comprises generating the combined correlation signal by summing or multiplying the filtered correlation signals from the at least first and second correlation paths.

3. The method of claim 2, wherein the difference in the delays used by the first and second correlation paths is selected based on a specified sensitivity of the burst detection to frequency offset.

4. The method of claim 1, wherein, for at least one correlation path, the correlation filter is a multitap filter having a set of negative-valued tap coefficients applied to less-recent samples of the corresponding correlation signal and a set of positive-valued tap coefficients applied to more-recent samples of the corresponding correlation signal.

5. The method of claim 4, wherein the magnitude of each negative-valued tap coefficient is about half the magnitude of each positive-valued tap coefficient.

6. The invention of claim 1, further comprising:
   (d) interpolating between samples of the combined correlation signal corresponding to the detected peak to generate an upsampled signal; and
   (e) detecting a refined peak in the upsampled signal as corresponding to the burst.

7. The method of claim 6, wherein step (d) comprises 2nd-order polynomial interpolation between at least three samples of the combined correlation signal.

8. The method of claim 6, further comprising downsampling the complex input signal prior to application to the one or more correlation paths.

9. The method of claim 1, wherein the complex input signal is a wireless communications signal and the burst is a frequency correction burst.

10. The method of claim 9, wherein the wireless communications signal conforms to a GSM/EDGE standard.

11. The method of claim 1, wherein the burst is a complex sinusoidal signal.

12. The method of claim 1, wherein:
   step (a) comprises applying the complex input signal to at least first and second correlation paths having different delays between their respective first and second copies of the complex input signal and applying different correlation filters to their respective correlation signals;
   step (b) comprises generating the combined correlation signal by summing or multiplying the filtered correlation signals from the at least first and second correlation paths;
   the difference in the delays used by the first and second correlation paths is selected based on a specified sensitivity of the burst detection to frequency offset;
   for at least one correlation path, the correlation filter is a multi-tap filter having a set of negative-valued tap coefficients applied to less-recent samples of the corresponding correlation signal and a set of positive-valued tap coefficients applied to more-recent samples of the corresponding correlation signal;
   the magnitude of each negative-valued tap coefficient is about half the magnitude of each positive-valued tap coefficient;

further comprising:
- (d) interpolating between samples of the combined correlation signal corresponding to the detected peak to generate an upsampled signal; and
- (e) detecting a refined peak in the upsampled signal as corresponding to the burst;

step (d) comprises 2nd-order polynomial interpolation between at least three samples of the combined correlation signal; and further comprising downsampling the complex input signal prior to application to the one or more correlation paths.

13. The method of claim 12, wherein the complex input signal is a wireless communications signal conforming to a GSM/EDGE standard and the burst is a complex sinusoidal frequency correction burst signal.

14. A non-transitory machine-readable storage medium, having encoded thereon program code, wherein, when the program code is executed by a machine, the machine implements a method for detecting a burst in a complex input signal, the method comprising:
- (a) applying the complex input signal to one or more correlation paths, each correlation path:
  - (1) generating first and second copies of the complex input signal, where there is a delay between the first and second copies of the complex input signal;
  - (2) generating a complex conjugate of the second copy of the complex input signal;
  - (3) multiplying the first copy of the complex input signal and the complex conjugate of the second copy of the complex input signal to generate a correlation signal; and
  - (4) applying a correlation filter to the correlation signal to generate a corresponding filtered correlation signal;
- (b) generating a combined correlation signal from the one or more filtered correlation signals from the one or more correlation paths; and
- (c) applying peak detection processing to the combined correlation signal to detect a peak indicative of the burst in the complex input signal, wherein each correlation filter is designed such that the peak in the combined correlation signal occurs prior to termination of the burst.

15. A burst detector for detecting a burst in a complex input signal, the burst detector comprising:
- one or more correlation paths, each correlation path adapted to:
  - (1) generate first and second copies of the complex input signal, where there is a delay between the first and second copies of the complex input signal;
  - (2) generate a complex conjugate of the second copy of the complex input signal;
  - (3) multiply the first copy of the complex input signal and the complex conjugate of the second copy of the complex input signal to generate a correlation signal; and
  - (4) apply a correlation filter to the correlation signal to generate a corresponding filtered correlation signal; and
- a peak detector adapted to apply peak detection processing to a combined correlation signal generated from the one or more filtered correlation signals from the one or more correlation paths to detect a peak indicative of the burst in the complex input signal, wherein each correlation filter is designed such that the peak in the combined correlation signal occurs prior to termination of the burst.

\* \* \* \* \*